Feb. 20, 1968  P. M. ROUBEAU  3,369,400
CRYOGENIC LIQUID LEVEL INDICATOR
Filed Sept. 30, 1963  4 Sheets-Sheet 1

Fig.1

INVENTOR.
PIERRE MAURICE ROUBEAU
BY
Bacon & Thomas
ATTORNEYS

Feb. 20, 1968    P. M. ROUBEAU    3,369,400
CRYOGENIC LIQUID LEVEL INDICATOR
Filed Sept. 30, 1963    4 Sheets-Sheet 2

INVENTOR.
PIERRE MAURICE ROUBEAU
BY
Bacon & Thomas
ATTORNEYS

Feb. 20, 1968 P. M. ROUBEAU 3,369,400
CRYOGENIC LIQUID LEVEL INDICATOR
Filed Sept. 30, 1963 4 Sheets-Sheet 3

INVENTOR.
PIERRE MAURICE ROUBEAU
BY
Bacon & Thomas
ATTORNEYS

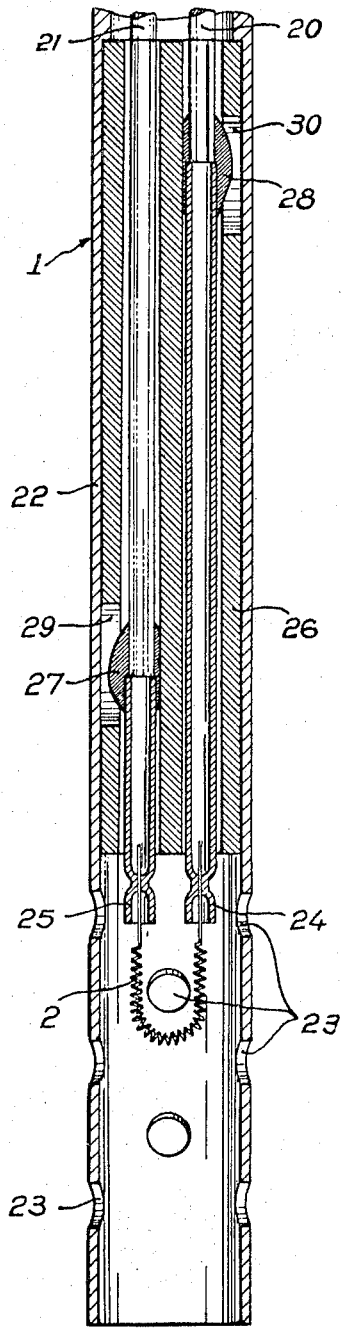

3,369,400
CRYOGENIC LIQUID LEVEL INDICATOR
Pierre Maurice Roubeau, Palaiseau, France, assignor to
Commissariat à l'Energie Atomique, Paris, France
Filed Sept. 30, 1963, Ser. No. 312,489
Claims priority, application France, Oct. 9, 1962,
911,649
2 Claims. (Cl. 73—295)

The present invention relates to an improved gauge for the purpose of measuring the level of a liquid contained in a vessel.

It is known that gauges of this type usually comprise an immersion resistance, an electric current source, and a device which indicates the variation in electrical properties of the resistance depending on whether this latter is immersed in a liquid or gaseous medium, especially when it is required to measure variations in level of cryogenic liquids. The term "cryogenic liquid" is understood to mean all gases which are liquefied at temperatures below 150 degrees Kelvin. However, the gauges which have been constructed up to the present time do not make it possible to obtain accurate measurements with a minimum of safety and simplicity of manipulation when the liquid considered is liquid helium.

The present invention has for its object an improved gauge which overcomes these disadvantages and the principle of operation of which is based on the dissipation of heat of an ohmic resistance through which a current passes, said heat dissipation taking place more or less readily according to whether said resistance is immersed in a liquid, especially in liquid or not helium.

The temperature of the resistance is established at a value which is inversely proportional to the amount of energy transferred from said resistance to the liquid. In point of fact, the electrical resistivity of pure metals (in contradistinction to alloys) varies to a substantial extent with the temperature.

The measurement of this difference in resistivity (which accompanies a variation in temperature) between the emerged position and immersed position thus provides a means of detecting the level of the liquid.

By producing a progressive increase in the voltage V which is applied across the terminals of a wire of pure metal, for example titanium wire, which is maintained immersed in a liquefied gas, and by measuring the intensity I of the current which flows through said wire, there is thus obtained a curve $I=f(V)$ which is composed of two distinctly different portions. The first portion is a straight line which rises sharply from the origin. The second portion has a curvilineal appearance with a small angle of slope.

The straight portion of the curve $I=f(V)$ corresponds to a nuclear boiling state wherein a substantial thermal flux can be exchanged between the metallic wire and the liquid helium without requiring a substantial temperature difference. When the resistance becomes heated as a result of increase in voltage, the jump temperature is exceeded and the electrical and calorific properties of the ohmic resistance change abruptly. This jump results in a very sharp elbow in the curve $I=f(V)$ and in an increase in resistivity as well as in the applied voltage, which indicates a substantial heating of the wire. The point which is located at the junction of the straight portion and of the curvilineal portion is referred to as the "calefaction threshold." Beyond the calefaction threshold, there occurs a film boiling state which is accompanied by a considerable reduction in the coefficient of heat transfer between the metallic wire and the liquid helium.

By carrying out the same experiment in a medium of gaseous helium, a second curve $I=f(V)$ is obtained, the straight portion of which coincides with that of the curve which corresponds to a measurement in liquid helium, and the second or curvilineal portion of which is parallel but having ordinates which are 15 to 20% smaller than those of the liquid-medium curve.

According to the report by Messrs. G. Klippinf and R. C. Rass which was published in the August, 1961 issue of "Kaltetechnic," the displacement as ordinates of the curvilineal portions of the curves $I=f(V)$ measured respectively in liquid helium and in gaseous helium results in two methods for detecting the level of a cryogenic liquid.

The first method consists in causing a current of constant intensity to pass through a wire of pure metal and in observing the substantial variation in the voltage applied to the terminals of the wire at the time of its transition from liquid helium to gaseous helium. This method necessitates a powerful source of constant intensity and calls for a circuit comprising four wires. Apart from the disadvantage of producing a dissipation of energy, this method results almost inescapably in the destruction of the resistance if current passes through this latter at room temperature.

The second method consists in applying a fixed voltage across the terminals of the wire, thereby making it possible to observe a variation in current intensity at the time of transition of the wire from liquid helium to gaseous helium.

This second method is subject to a disadvantage in that it does not provide a sharp response in view of the fact that the variation in intensity does not exceed values of the order of 15 to 20%. Furthermore, this method permits the use of portable electric-current sources of the dry cell or accumulator type only in respect of a fairly small proportion of their load capacity.

The gauge in accordance with the present invention overcomes all the disadvantages referred-to above and is particularly distinguished by its simplicity of construction, its accuracy of measurement, its lightness of weight, its sturdiness, its small size which permits of access to the vessel containing the cryogenic liquid through a small opening or alternatively through a curved conduit, the possibility which it affords of being employed under pressures which are different from atmospheric pressure, its low cost of manufacture and of maintenance and its independence of operation.

Accordingly, the gauge essentially comprises a source of electrical energy, an ohmic resistance which is intended to be immersed in the cryogenic liquid, a switch for the purpose of putting said source of electrical energy into service and a current-variation indicator which is connected in series with the resistance, said indicator enabling the operator to observe the transition of the resistance from the liquid medium to the gaseous medium.

The object of the present invention is additionally characterized by the following points to be considered either separately or in combination:

The indicator is a device which is highly responsive to variations in current intensity and which is capable of giving an "all-or-none" response in respect of a variation in intensity of the order of 15%.

The indicator of the "all-or-none" type is a straight-filament light bulb of the flashlight type, the voltage and minimum current intensity of the bulb being preferably respectively 1.1 volts and 0.22 amp.

The source of electrical energy is an accumulator or dry cell, preferably a dry cell, the rated voltage of which is 1.5 volts.

The immersion resistance is constituted by a wire of pure metal having high electrical and thermal resistivity and retaining a high temperature coefficient in the vicinity of the absolute zero point of temperature.

The immersion resistance is constituted by a wire of metal which is highly strain-hardened in such manner as to ensure that its characteristic curve $I=f(V)$ affords a practically horizontal plateau in respect of a wide range of voltages applied.

The metal which constitutes the immersion resistance is preferably titanium.

The wire of pure metal which constitutes the immersion resistance is wound into a coil having turns of small pitch, the diameter of said coil being as small as possible, and preferably having a value of 70 microns, in order to produce a threshold of calefaction in respect of very low current intensities which are preferably within the range of 0.6 amp. to 0.22 amp.

The turns of the immersion resistance are bent into the shape of a U or V in such a manner as to concentrate the heat evolution.

Further characteristic features will be brought out by the following description of a form of embodiment which is given solely by way of example, reference being made therein to the accompanying drawings, in which:

FIG. 1 represents the curves $I=f(V)$ which are obtained by means of devices of the prior art.

FIG. 2 represents the curves $I=f(V)$ which are obtained by means of the gauge in accordance with the invention, depending on whether the immersion resistance is located in liquid helium or gaseous helium.

Figure 3:
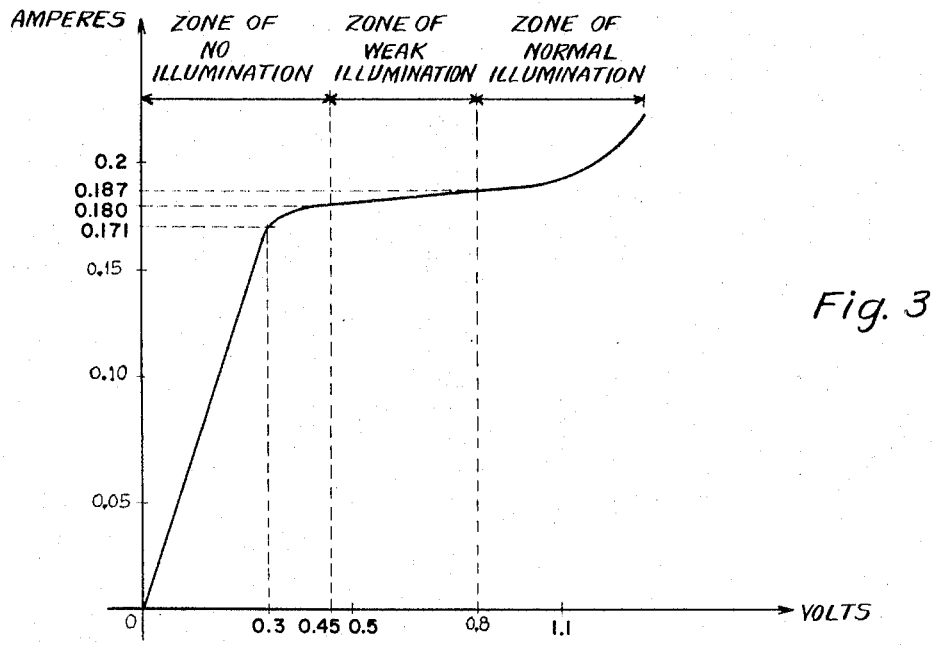

FIG. 3 respresents the characteristic curve $I=f(V)$ of a flashlight bulb.

Figure 4:
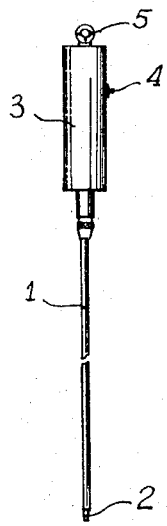

FIG. 4 represents a diagrammatic view of the gauge in accordance with the invention.

Figure 5:
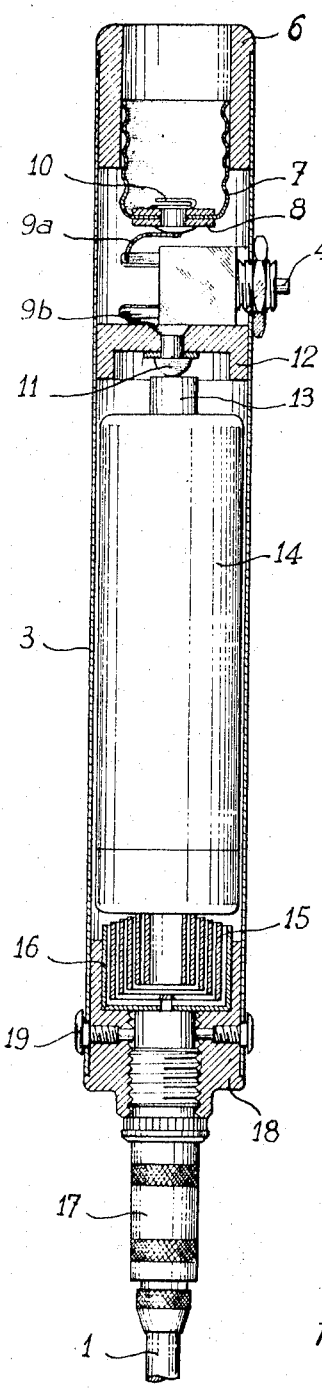

FIG. 5 represents a detail sectional view of the top portion of the gauge.

FIG. 6 represents a detail sectional view of the bottom portion of the gauge as shown on a larger scale.

In FIG. 1, the curve $I=f(V)$ which is designated by the reference $a$ shows the different behavior characteristics of a metallic resistance which is immersed in a cryogenic liquid. It can be observed that the resistance $R=V/I$ remains small and constant up to the point $C_{(a)}$ which marks the threshold of calefaction. Starting from this threshold $C_{(a)}$, the resistance $R$ becomes suddenly high and increases progressively as the voltage $V$ increases.

The curve $b$ which indicates the behavior characteristics of the same metallic resistance but which is immersed in this case in the gaseous medium of the same cryogenic liquid is identical to the curve $a$ up to the point $C_{(b)}$. Starting from the threshold $C_{(b)}$, the slope of the curve $b$ decreases continuously and, in respect of a given voltage $V$, the curve $b$ gives values of current intensity which are smaller by 15 to 20% relatively to those of the curve $a$.

If the high voltage and power which are necessary and also the fragile nature of the metallic wire which constitutes the immersion resistance do not represent any objectionable difficulty, it will accordingly be possible to make use of this difference in behaviour of the immersion resistance for the purpose of detecting the level of the cryogenic liquid, either by maintaining the voltage value $V_c$ or by maintaining the current intensity $I_c$ at a constant value.

FIG. 2 shows the curves $I=f(V)$ of the immersion resistance E in accordance with the invention. Said resistance is constituted by a wire of pure titanium. The diameter of the wire is equal to 45 microns. The resistance is made up of 50 turns of small pitch having a winding diameter of 70 microns. In order to concentrate the evolution of heat, the immersion resistance is bent into either a U-shape or V-shape. At 300 degrees Kelvin, the resistance of the pure titanium wire reaches 10 ohms and, at 4 degrees Kelvin, said resistance is only of the order of 1 ohm. The curves $c$ and $d$ represent the current intensity $I$ as a function of the voltage $V$ and are characteristic of the electrical behaviour of the immersion resistance in accordance with the invention. The curve $c$ corresponds to the immersion of the resistance in liquid helium and the curve $d$ represents the electrical behaviour of said resistance when it is immersed in gaseous helium immediately above the surface of the liquid. In FIG. 2, it can be readily seen that, on the one hand, the intensities of the currents which flow through the immersion resistance are very low (of the order of 0.16 to 0.22 amp.) and that, on the other hand, the current intensity remains practically constant starting from a voltage of 0.5 volt.

FIG. 3 represents the characteristic curve $I=f(V)$ of a small straight-filament bulb of the type commonly employed in flashlights. The characteristics which are indicated by this curve may vary by ±20% depending on the manufacturer. By way of example, a bulb of this type has a level stage of current intensity which corresponds to voltages within the range of 0.3 to 1.10 volts. In the case of a voltage of 0.3, the current intensity is, for example, 0.171 amp. and the bulb is accordingly in the extinguished condition. The first red spot on the bulb filament appears in respect of a voltage of 0.45 ($I=0.18$ amp). In the case of a voltage of 0.80, the current intensity is 0.187 amp. and the bulb provides almost normal brightness.

It is then observed that the connecting in series of a lamp bulb of this type with the immersion resistance makes it possible to obtain an "all-or-none" response depending on whether said resistance is immersed in the liquid phase or in the gaseous phase of the helium, the bulb being accordingly either lighted up or extinguished; by virtue of this novel combination, it becomes possible to measure the level of liquid helium with a degree of accuracy of the order of 1 mm.

FIG. 4 is a diagrammatic illustration of the gauge in accordance with the invention. Said gauge is presented in the form of a hollow tubular rod 1 of stainless steel provided at one end with an immersion resistance 2 of strain-hardened titanium wire and at the other end with a casing 3 fitted with a switch 4. Said switch 4 produces action on the terminal electric circuit of a bulb 5 which is preferably disposed on the uppermost face of the casing 3.

FIG. 5 illustrates in detail the construction of the casing 3. There is provided in the top portion of the casing a brass member 6 which is fitted with a socket 7 for the purpose of accommodating the bulb 5. The insulating base 8 of the socket 7 provides a passageway for a lead 9a which connects the central contact-stud 10 of the socket 7 to one of the terminals of the switch 4. The other terminal of said switch 4 is connected by means of a lead 9b to a contact-stud 11 which passes through an insulating washer 12 made, for example, of fiber, and which is in contact with the positive pole of a dry cell 14. The other pole of the cell 14 is supported on a spring 15 fitted inside an insulating capsule 16. Said capsule 16 and the upper portion of a connector 17 are fixed inside suitable bores of a cylindrical member 18 of brass which fits inside the casing 3 and which is held in position therein by means of a bayonet fastening 19. Two leads 20 and 21 of enamelled copper wire connect the casing 3 through the hollow tube 1 to the immersion resistance 2 (as shown in FIG. 6). The two leads 20 and 21 are secured with insulation inside the connector 17, a contact being established between one of the wires 20 and 21 and the spring 15 and between the other wire and the cylindrical brass member 18.

By reference to FIG. 6, it will be observed that the lower extremity 22 of the hollow tube 1 of stainless steel has an internal bore of slightly larger diameter than that of the remainder of the tube 1.

Said extremity 22 is intended to receive the immersion resistance 2 and accordingly forms a protective casing for this latter. At the level of the immersion resistance 2, the extremity 22 of the tube 1 comprises a number of openings 23 which permit of a better contact between the resistance 2 and the fluids. The two extremities of the immersion resistance 2 are secured to two tubes 24 and 25 of nickel which are fitted inside two bores of a tube 26 of alumina which is in turn fitted inside the extremity 22 of the tube 1.

The tubes 24 and 25 of nickel have different lengths and are connected to the enamelled copper wires 20 and 21 by means of welded joints 27 and 28 which are formed through the openings 29 and 30 of the tube 26.

The operation of the gauge described is as follows:

The rod 1 which carries the immersion resistance 2 at the lower extremity 22 thereof is introduced inside the vessel which contains liquid helium. In order to connect the bulb 5 to the positive pole 13 of the dry cell 14, pressure is applied on a control push-button of the switch 4. When the resistance 2 of titanium wire is immersed in liquid helium, there flows through the electric circuit a current whose intensity is such that the bulb 5 lights up. The bulb is extinguished when the titanium wire 2 emerges from the liquid helium inasmuch as the current intensity in the wire 2 has decreased. By means of the gauge, it is possible to detect the level of liquid helium with a precision of measurement of 1 mm.

The brightness of the bulb 5 remains normal or practically normal as long as the voltage of the cell 14 remains higher than 1.1 volts at a current intensity of 0.20 amp. The voltage drops are then respectively 0.2 volt in the resistance 2 which is immersed in liquid helium, 0.1 volt in the leads 20 and 21, and 0.8 volt in the straight filaments of the bulb 5. When the resistance 2 is taken out of the liquid helium, the voltage across the bulb terminals accordingly drops from 0.8 volt to 0.3 volt. This change of voltage can be observed from the fact that the bulb is then extinguished; this observation can also be made by any other suitable means, for example, with the aid of a galvanometer.

The gauge can be put to use in respect of a range of pressures having as end values 0.5 and 1.5 atmospheres absolute. Below 0.5 atmosphere absolute, the plateaus of the characteristic curves $I=f(V)$ (as shown in FIG. 2) of the immersion resistance 2 fall off and the bulb no longer lights up, even if the resistance 2 is immersed in liquid helium. However, the level stages of current intensity remain and it is therefore possible to detect the transition of the resistance 2 from the liquid phase to the gaseous phase by means of a milliammeter (so adjusted that its total deflection corresponds to 3 milliamperes) which is connected in series with a 300-ohm resistance and conected to the terminals of the bulb 5. The transition of the immersion resistance 2 above the level of the liquid helium will be shown on the milliammeter by a deflection through two milliampere graduations.

As will be readily understood, it would also be possible to connect two bulbs in parallel in the electric circuit of the gauge, the two bulbs in that case having different characteristics in such manner as to permit the operation of the gauge at normal pressures and also at low pressures. In this case, provision must be made for two switches respectively in series with each bulb, one for measurement at normal pressure and the other for measurement at low pressure.

What we claim is:

1. A gauge for cryogenic liquids comprising, a source of electrical energy, an ohmic resistance arranged to be immersed in said cryogenic liquid, an indicator responsive to current variations connected in series with said resistance, a switch for connecting said source of electrical energy to said current-variation indicator and said resistance whereby to make it possible to determine the position of said resistance relative to the level of said cryogenic liquid, said resistance being a metal wire, strain hardened to provide a characteristic curve of $I=f(V)$ having a substantially horizontal plateau over a wide voltage range, said wire being wound into a coil having turns of small pitch, the diameter of said coil being as small as possible and preferably having a value of 70 microns for a wire of 40-micron diameter in order to produce a threshold of calefaction in respect of very low current intensities which are preferably within the range of 0.16 to 0.22 amp.

2. A gauge in accordance with claim 1, wherein the turns of the resistance coil are bent into a generally U-shape so as to concentrate the evolution of heat.

References Cited

Power, A. D.: Review of Scientific Instruments, June 1943, p. 188.

LOUIS R. PRINCE, *Primary Examiner.*

D. McGIEHAN, D. M. YASICH, *Assistant Examiners.*